US012681825B2

(12) United States Patent
Knierim et al.

(10) Patent No.: US 12,681,825 B2
(45) Date of Patent: Jul. 14, 2026

(54) CONTAINER RUNTIME ENVIRONMENT WITH DISTRIBUTED MONITORING TASKS AND MINIMUM PRIVILEGES

(71) Applicant: Siemens Aktiengesellschaft, Munich (DE)

(72) Inventors: Christian Knierim, Munich (DE); Christian Peter Feist, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 21 days.

(21) Appl. No.: 18/838,837

(22) PCT Filed: Jan. 30, 2023

(86) PCT No.: PCT/EP2023/052134
§ 371 (c)(1),
(2) Date: Aug. 15, 2024

(87) PCT Pub. No.: WO2023/156175
PCT Pub. Date: Aug. 24, 2023

(65) Prior Publication Data
US 2025/0156291 A1 May 15, 2025

(30) Foreign Application Priority Data
Feb. 16, 2022 (EP) .................................... 22157092

(51) Int. Cl.
*G06F 11/30* (2006.01)
(52) U.S. Cl.
CPC ................................ *G06F 11/3051* (2013.01)

(58) Field of Classification Search
None
See application file for complete search history.

(56) References Cited

U.S. PATENT DOCUMENTS

| | | | | | |
|---|---|---|---|---|---|
| 5,828,876 | A | * | 10/1998 | Fish .................... | G06F 16/1858 |
| | | | | | 710/200 |
| 11,144,423 | B2 | * | 10/2021 | Moradi ............... | G06F 11/3096 |
| 11,900,173 | B2 | * | 2/2024 | Caine .................. | G06F 9/45529 |

(Continued)

OTHER PUBLICATIONS

Search Report for International Application No. PCT/EP2023/052134, 9 pages, Mar. 6, 2023.

(Continued)

*Primary Examiner* — Michael Sun
(74) *Attorney, Agent, or Firm* — Slayden Grubert Beard PLLC

(57) ABSTRACT

Various embodiments of the teachings herein include a container runtime environment comprising: container application instances; and container monitoring instances. The container monitoring instances monitor the container application instances. Monitoring of the container application instances includes subdivided monitoring tasks. Each monitoring task is assigned at least one privilege exclusively enabling an execution of the respective assigned monitoring task. Execution of the monitoring task comprises enforcement of an assigned set of rules. The container monitoring instances are each allocated a monitoring task. The container monitoring instances each have the at least one privilege assigned to their monitoring task.

20 Claims, 1 Drawing Sheet

(56) References Cited

U.S. PATENT DOCUMENTS

| | | | | |
|---|---|---|---|---|
| 2002/0188643 A1* | 12/2002 | Kennedy | H04L 63/102 | |
| | | | | 718/1 |
| 2004/0039803 A1* | 2/2004 | Law | H04L 41/0893 | |
| | | | | 709/223 |
| 2004/0073694 A1* | 4/2004 | Frank | H04L 47/20 | |
| | | | | 370/412 |
| 2004/0267897 A1* | 12/2004 | Hill | G06F 9/505 | |
| | | | | 709/217 |
| 2005/0038790 A1* | 2/2005 | Wolthusen | H04L 63/20 | |
| 2013/0232573 A1* | 9/2013 | Saidi | G06F 21/6218 | |
| | | | | 726/22 |
| 2017/0315795 A1 | 11/2017 | Keller | | |
| 2017/0318048 A1* | 11/2017 | Htay | H04L 63/1433 | |
| 2018/0123928 A1 | 5/2018 | Moradi | | |
| 2019/0324882 A1* | 10/2019 | Borello | G06F 9/5077 | |
| 2020/0334362 A1 | 10/2020 | Stoler | | |
| 2021/0200592 A1* | 7/2021 | Guim | G06F 9/5011 | |

OTHER PUBLICATIONS

Search Report for EP Application No. 22157092.2, 9 pages, Jul. 28, 2022.
Yang Yutian et al: "Security Challenges in the Container Cloud"; 2021 Third IEEE International Conference on Trust, Privacy and Security in Intelligent Systems and Applications (TPS-ISA), IEEE; pp. 137-145; XP034112058; DOI: 10.1109/TPSISA52974.2021. 00016; 2021.

\* cited by examiner

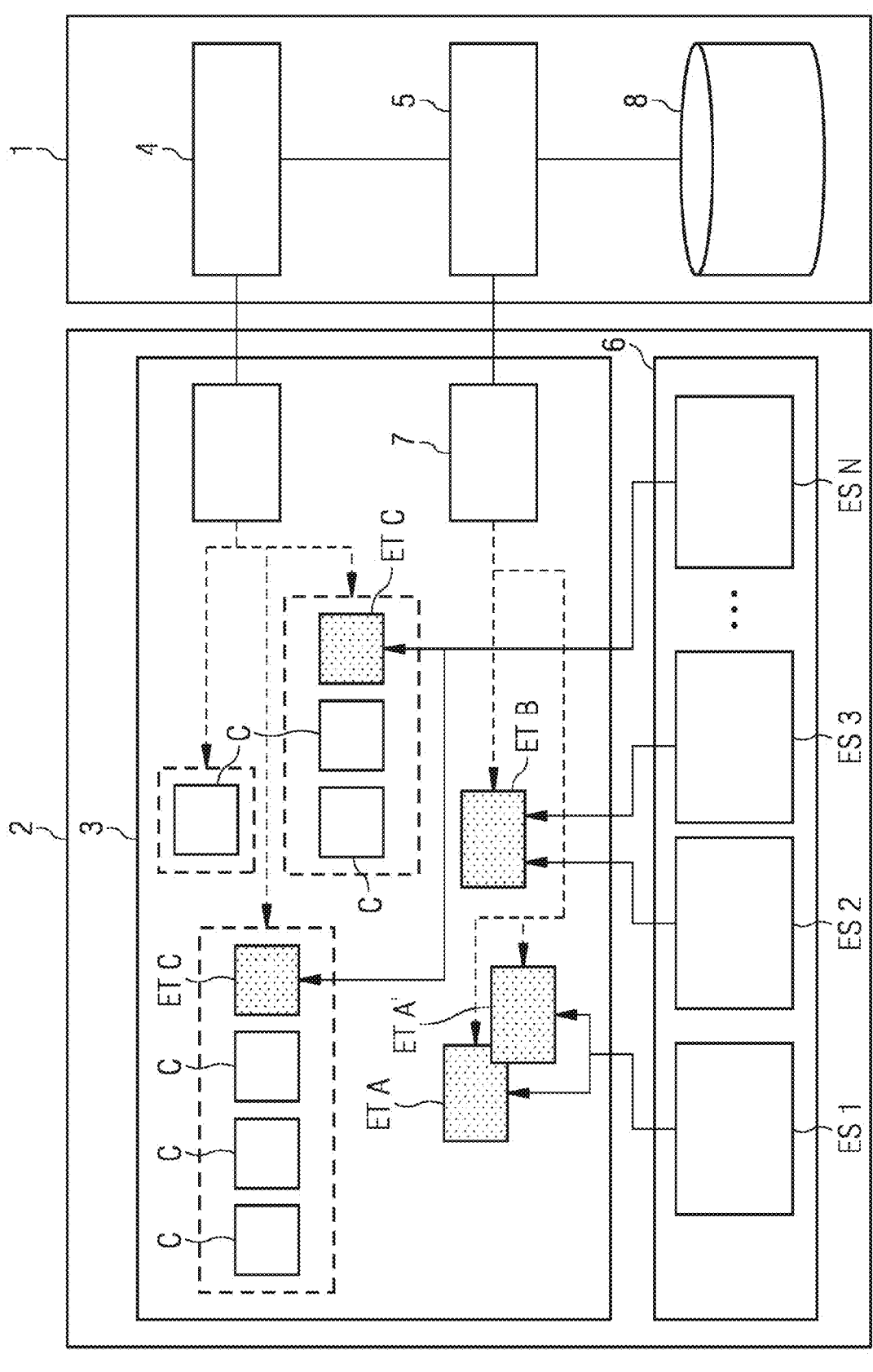

CONTAINER RUNTIME ENVIRONMENT WITH DISTRIBUTED MONITORING TASKS AND MINIMUM PRIVILEGES

CROSS-REFERENCE TO RELATED APPLICATIONS

This application is a U.S. National Stage Application of International Application No. PCT/EP2023/052134 filed Jan. 30, 2023, which designates the United States of America, and claims priority to EP application Ser. No. 22/157,092.2 filed Feb. 16, 2022, the contents of which are hereby incorporated by reference in their entirety.

TECHNICAL FIELD

The present disclosure relates to container runtime environments. Various embodiments of the teachings herein include container runtime environments, technical devices, and/or associated systems.

BACKGROUND

Container instances can be monitored and restricted in multiple ways. One possibility is for a privileged process outside the container instance to monitor the latter and optionally further instances and to restrict the operations thereof in the event of non-conformity or to trigger an alarm. In the application of container runtime environments, in particular Docker, such solutions additionally often obtain access to an interface, in particular a Docker socket, via which status information of the current container instances is retrieved, resources are created and full control over the container runtime environment is thus made possible. These monitoring and restriction components can also be realized as a container instance, which then require the corresponding privileges in the form of access authorizations to the Docker socket, in particular in the form of file system authorizations or process authorizations the respective instance, and these can be extended or restricted in particular with the aid of seccomp profiles and capabilities, which has the consequence that this container instance on a runtime environment needs to be very highly privileged in order to be able to carry out monitorings and restrictions.

Another possibility for monitoring and restriction is for the monitoring component to be started as a so-called sidecar container with respect to the actual container instance and to perform monitoring by partitioning corresponding Linux namespaces and allocating privileges in particular with the aid of Linux capabilities or seccomp profiles. Operations that are not allowed can optionally be prevented by the containerized monitoring component.

The known approaches encounter some or all of the following problems:

In the case of known implementations of such monitoring components, in such an instance a large number of functionalities are mapped into a very highly privileged container instance. The component thus de facto obtains very many privileges which are needed for different monitoring tasks. In particular, many known implementations require access to the Docker socket, allowing full control to be taken over the container runtime environment.

If the implementation of a monitoring component is realized by way of a sidecar container, the user wanting to start the actual workload container instance obtains all privileges required for starting the (monitoring)

sidecar container. As a result, the situation where the user starting the containers obtains only the minimum rights cannot be enforced by operators of the runtime environment.

If more resources than are allocated to the monitoring component are required on a platform for the monitoring of an instance, this can only be realized by dynamic allocation of more CPU memory/and (main) memory for the monitoring instance or, in the case of an overload situation, events generated by the instance are rejected or processed with a severe delay. A scaling of the monitoring instances for a workload container instance is not currently known.

On account of the high authorizations, the problem arises that a user, in this case an attacker, in the described scenarios with a successful attack on the monitoring instance, obtains very extensive authorizations which in most cases de facto do not differ from the underlying system.

SUMMARY

The teachings of the present disclosure may be employed for improved monitoring of a container runtime environment and an implementation of countering measures if necessary. For example, some embodiments include a container runtime environment (3), having: container application instances (C), container monitoring instances (ET-C), wherein the container monitoring instances (ET-C) are designed for monitoring the container application instances (C), wherein the monitoring of the container application instances (C) is subdivided into monitoring tasks, wherein each monitoring task is assigned at least one privilege which exclusively enables an execution of the monitoring task to which it is assigned, wherein the execution of the monitoring task comprises an enforcement of an assigned set of rules, wherein the container monitoring instances (ET-C) are each allocated a monitoring task and wherein the container monitoring instances (ET-C) each have the at least one privilege assigned to their monitoring task.

In some embodiments, the monitoring task is designed as: monitoring started processes, setting up network connections, monitoring active network connections, monitoring write accesses, checking for weak points, limiting syscalls, allocating privileges and/or monitoring privileges of the processes.

In some embodiments, the at least one privilege is designed to the effect that the container monitoring instances (ET-C) can execute the monitoring task allocated thereto but no further monitoring tasks.

In some embodiments, a first monitoring task of the monitoring tasks has a task portion which is not a task portion of a second monitoring task.

In some embodiments, the monitoring tasks each have a task portion which is not a task portion of the rest of the monitoring tasks.

In some embodiments, a plurality of container monitoring instances (ET-C) are allocated the same monitoring task.

In some embodiments, the container monitoring instances (ET-C) at least in part are each allocated a plurality of monitoring tasks.

In some embodiments, the container runtime environment (3) runs on: an industrial system (2), an industrial computer (2), an industrial device (2), a computer (2), a mobile device (2), a control device (2), a device of an Internet of Things environment (2), an edge device (2), a server (2) and/or a cloud server (2).

As another example, some embodiments include a technical device (2) having one or more of the container runtime environments (3) described herein.

In some embodiments, there is a superordinate management system (1) assigned to the technical device (2).

In some embodiments, the container monitoring instances (ET-C) were started by a scaling component (5) which is specifically designed for this, in particular a monitor orchestration instance (5) of the superordinate management system (1), or the container monitoring instances (ET-C) were started by a scaling component (5) which is specifically designed for this and which is implemented within the container runtime environment (3).

In some embodiments, the scaling component (5) is designed to start further container monitoring instances (ET-C) with identical monitoring tasks as a function of a capacity utilization of the container monitoring instances (ET-C).

In some embodiments, a monitoring instance policy (8) is consulted by the scaling component (5).

In some embodiments, the system (6) includes: a monitoring agent (7) designed to produce an interface between the scaling component and the container monitoring instances (ET-C) and/or an interface between data sources and the container monitoring instances (ET-C) via which the container monitoring instances (ET-C) obtain data for carrying out their monitoring task.

In some embodiments, the container application instances (C) were started by an application orchestration instance (4) which is not designed to start the container monitoring instances (ET-C).

BRIEF DESCRIPTION OF THE DRAWINGS

Various features and applications of the teachings herein are clear from the following explanations of a plurality of exemplary embodiments with reference to the schematic drawing, in which the single FIGURE shows a system incorporating teachings of the present disclosure.

DETAILED DESCRIPTION

The teachings of the present disclosure relate to container runtime environments. Some embodiments incorporating teachings of the present disclosure include: container application instances and container monitoring instances. The container monitoring instances are designed for monitoring the container application instances. The monitoring of the application instances is subdivided into monitoring tasks. Each monitoring task is assigned at least one privilege which exclusively enables an execution of the monitoring task to which it is assigned. The execution of the monitoring task comprises an enforcement of an assigned set of rules. The container monitoring instances are each allocated a monitoring task. The container monitoring instances each have the at least one privilege assigned to their monitoring task.

In some embodiments, a container runtime environment is classified in categories and a dedicated container monitoring instance with minimally required privileges is started for each category, which may also be referred to as segmentation.

In some embodiments, the container monitoring instances can be replicated in the case of corresponding overloading, that is to say that a scaling is carried out. To put it another way, the teachings herein may reduce the required privileges for the monitoring of the container runtime environment by segmentation of the individual functions among individual container monitoring instances and at the same time enables a better scalability for these container monitoring instances.

In some embodiments, the monitoring task is designed as:
monitoring started processes,
setting up network connections,
monitoring active network connections,
monitoring write accesses,
checking for weak points,
limiting syscalls,
allocating privileges and/or
monitoring privileges of the processes.

The monitoring of the application instances is subdivided into monitoring tasks. Each monitoring task is assigned at least one privilege which exclusively enables an execution of the monitoring task to which it is assigned. The execution of the monitoring task additionally comprises an enforcement of an assigned set of rules, whereby in particular operations of the application instances are restricted in the case of non-conformity and/or an alarm is triggered. The assigned set of rules describes what requests from a container monitoring instance and/or to an application instance are permitted and/or what state of an application instance is intended to govern the restriction thereof. In particular, in the case of processes, no processes may be executed with specific process privileges, in particular individual components may only be started if these have no weak points. In the case of certain executed operations, the instance can also be completely stopped, in particular write accesses to a specific area of a file system.

In that context, the monitoring of active network connections concerns the monitoring of the traffic taking place. One application example would be, in particular, a layer 7 firewall functionality, in which content inspection is carried out. Content inspection is understood to mean the checking of a network connection at the application level by a perimeter, such as a firewall, in particular. This ensures that not only is a layer 4 check conducted in respect of addresses and port, but also the expected application protocol is applied via the connection. In particular, this involves checking whether, via an http connection stored in the perimeter, the application protocol http is actually used by both communication partners.

An exclusive monitoring of the network traffic on the transport layer (layer 4 firewalling) can be carried out by monitoring the setting up of network connections; however, current enterprise firewalls also offer traffic monitoring at runtime by means of content inspection (layer 7 firewalling).

In some embodiments, the at least one privilege is designed to the effect that the container monitoring instances can execute the monitoring task allocated thereto but no further monitoring tasks. This has the effect that each container monitoring instance has only minimally necessary privileges.

In some embodiments, a first monitoring task of the monitoring tasks has a task portion which is not a task portion of a second monitoring task. This has the advantage that a first container monitoring instance is responsible and privileged for individual monitoring tasks and associated sets of rules.

In some embodiments, the monitoring tasks each have a task portion which is not a task portion of the rest of the monitoring tasks. This has the advantage that each container monitoring instance is responsible and privileged for individual monitoring tasks and associated sets of rules.

In some embodiments, a plurality of container monitoring instances are allocated the same monitoring task. This may also be referred to as scaling of the container monitoring instances. If, for one container monitoring instance, which may also be referred to as enforcer type, an overload situation is recognized, in particular number of application instances, which may also be referred to as workload containers, number of network connections set up in a specific time window, an enforcer orchestration instance can restart a further enforcer instance of the same type and provide a load balancer functionality. The scaling is thus outsourced to a dedicated orchestrator, the enforcer orchestration instance, for the monitoring instance and separated from a normal orchestrator that carries out the scaling of the application instances.

A problem with a common orchestrator for monitoring and application instances is that it would have to be extensively exposed for the transfer of orchestration information. Separation from the normal orchestrator affords the advantage that the latter can be better safeguarded. Both orchestrators, the one for monitoring instances and the one for application instances, can additionally be manifested as privileged container instances, but are typically autonomous systems. The load balancer functionality, depending on the type, can optionally be ensured by the restarting of a corresponding container or of a load balancer resource managed by the orchestrator which performs this functionality on the application side.

In some embodiments, the container monitoring instances at least in part are each allocated a plurality of monitoring tasks. This embodiment concerns only interrelated tasks of low complexity which can be combined on account of the privileges necessary therefor. The heart of the invention is the subdivision into monitoring tasks and distribution of minimally necessary privileges.

In some embodiments, the container runtime environment runs on:

an industrial system,
an industrial computer,
an industrial device,
a computer,
a mobile device,
a control device,
a device of an Internet of Things environment,
an edge device,
a server and/or
a cloud server.

Some embodiments include a technical device having one of the container runtime environments described herein. The container runtime environment can be a Docker runtime environment.

Some embodiments include a system, having:

a technical device incorporating teachings of the present disclosure; and
a superordinate management system assigned to the technical device.

In some embodiments, the container monitoring instances have been started by a scaling component which is specifically designed for this, in particular a monitor orchestration instance, which may also be referred to as enforcement orchestrator instance, of the superordinate management system. The scaling component is specifically designed for starting the container monitoring instances and this is not carried out by the scaling component responsible for the workload instances.

In some embodiments, the container monitoring instances have been started by a scaling component which is specifically designed for this and which is implemented within the container runtime environment. The scaling component is designed as a container instance.

In some embodiments, the scaling component is designed to start further container monitoring instances with identical monitoring tasks as a function of a capacity utilization of the container monitoring instances. The decision as to which and how many monitoring instances are intended to be started is taken by a central enforcer orchestration instance, in particular also an enforcer orchestration instance allocated only to the respective instance, which enforcer orchestration instance may also be referred to as monitor orchestrator instance, or by the workload orchestrator itself in the case of orchestrated solutions such as Kubernetes. This enforcer orchestration instance obtains only the authorization to interpret the enforcer policy in order to decide which different instances monitoring are required and, if appropriate, to start and monitor further instances with the corresponding minimum authorizations. Otherwise it is not exposed any further and has no further connections and functions.

In some embodiments, a monitoring instance policy is consulted by the scaling component. If, for an enforcer type, an overload situation is recognized (in particular number of workload containers, number of network connections set up in a specific time window), the enforcer orchestration instance can restart a further enforcer instance of the same type and provide a load balancer functionality for distributing the tasks between the enforcer instances of the type. The load balancer functionality, depending on the type, can optionally be ensured by the restarting of a corresponding container or the incorporation of a load balancer resource managed by the enforcer instance or monitoring instance which performs this functionality on the application side.

In some embodiments, the load balancer functionality can be implemented within the kernel by virtue of the eBPF programs or kernel modules required for analysis forwarding the information concerning the operations carried out by the workload instances alternately to the respective enforcer instances. As soon as a scaling is affected (i.e. a further container instance is provided), the enforcer orchestrator thus needs to know which interfaces are required for reading out the data and to notify them of the instances to which the information is to be transferred. This adaptation can be carried out in particular by the loading of additional eBPF programs or with the aid of corresponding configuration interfaces of the kernel modules used for issuing/providing the information.

Furthermore, the enforcer orchestrator uses an enforcer policy defining which enforcer types (=ET; in particular ET A for checking read( ) system calls of all the workload containers) are intended to be used, when a specific enforcer is intended to be scaled (e.g. an additional ET A' for every four workload containers), or which apps are specifically intended to be monitored by an enforcer type (in particular, the intention is to monitor the network traffic of apps which originate from third-party providers by means of the sidecar containers ET C). The policy of the individual enforcer types is provided together with the latter. By way of example, the enforcers themselves can be realized as containers, as a result of which the policy can also be supplied in particular as part of the container image for the enforcer type.

If a specific enforcer type is intended to be started on the system, the enforcer agent firstly sets up the corresponding interfaces that provide the data to be analyzed. This can comprise e.g. the loading of a kernel module and an eBPF program. In the embodiment above, before the starting of an enforcer container of type B that is used to monitor which processes are started in containers and which Linux capabilities they use, eBPF programs or kernel modules for issuing the container-executed exec*( ) system calls and kernel-internal capable( ) functions are loaded. The enforcer container of type B uses the interfaces then present, which are available in particular as virtual files in the case of a kernel module, in order to obtain and subsequently evaluate the information.

The enforcer agent can be executed as an orchestration backend provided as an autonomous process for the enforcer, or else can be provided and executed as a container instance. In order to ensure that this is executed before the enforcer containers, this can be set up manually in particular by the administrator on the relevant systems before the functionality is set up. In the application example of Kubernetes, for this purpose there are so-called DaemonSets, which ensure that the respective agents are operated on all relevant systems.

If a condition for scaling an enforcer type is met, e.g. scaling of ET A in the example presented, since e.g. the processing of the many read( ) system calls is becoming more and more complex as the number of workload containers increases, the enforcer agent adapts the corresponding interface such that the latter can then be used by a plurality of enforcer containers. In this case, the data can be made available e.g. randomly or selectively either ET A or ET A' (simple load balancing). It is also conceivable for the system call data of specific workload containers to be assigned to the enforcer containers. The adaptation of the interfaces can be carried out, in particular in the case of eBPF programs, by the loading of further eBPF programs.

In some embodiments, the system additionally has a monitoring agent designed to produce:

an interface between the scaling component and the container monitoring instances and/or an interface between data sources and the container monitoring instances via which the container monitoring instances obtain data for carrying out their monitoring task.

In some embodiments, in the case of software updates for individual enforcer components, two instances of the same type are started with different versions and corresponding syscalls and/or data streams relevant to enforcement are issued in parallel to both versions for a time period (e.g. one hour) to be defined in the policy and the results are compared by a comparator component that is likewise activated by the enforcer orchestration component in the kernel.

There are at least two possibilities for this. In a first alternative, the first, old previous version is enforced and the second, newly started instance likewise effects monitoring and is not enforced; it is therefore in the audit mode and the results are compared. In a second alternative, the old previous version and the new version are not enforced and only effect auditing. In both cases, the comparator component is started as an additional instance which monitors the two enforcer versions and/or to which the results are reported.

The comparator component compares the results. If the results are identical, the comparator component ensures that the generated commands of the new version are reported back as successful, even though they have not been executed. If a deviation between the two enforcer containers is ascertained, besides the filtering of the syscall an alarm is additionally sent to the enforcer orchestrator component.

The latter can then prevent the new version of the enforcer component from being rolled out and the old version remaining active. The administrator for the enforcer components can then decide whether an update is nevertheless carried out or, for example, can firstly clarify with the manufacturer whether the changed behavior is desired and will not have any adverse effects on the restricted application components or a configuration change is required within the new enforcer version in order to ensure application operation without any problems.

In some embodiments, in order that in the case of an update of an enforcer type no security events are lost, rather a seamless transition is made possible, firstly to allow enforcer containers of the old variant and of the new variant to run in parallel. In this case, they would process the same data in parallel. If the enforcer versions yield different results for an event, the result of the new enforcer is used. The old version can then be suspended as of a specific point in time.

In some embodiments, the container application instances were started by an application orchestration instance which is not designed to start the container monitoring instances.

In some embodiments, both orchestration components can also be combined in one orchestration component, as can the corresponding agents on the target system. A separation may be advantageous if these are intended e.g. to be executed on different systems or to be managed by different administrators. If the connection between an enforcer orchestrator instance and a corresponding agent is interrupted, the enforcer orchestrator instance can report this to the workload orchestration instance and thus for example cause the workload containers to be migrated to a different target system with a functional and reachable enforcer agent.

In particular, a separation may be advantageous in cases where even central components of an enforcer orchestrator, in particular services for retrieving credentials, must not be exposed toward the workload containers and the risk of a compromise by the containers is thus minimized. The same applies to the interfaces to the user (administrator) of the orchestrators API. In this way, the normal orchestrator can be opened for a larger user group and the enforcer orchestrator is allowed to be accessed only from a specific admin network. Typically, an orchestrator orchestrates not just one runtime environment, but rather multiple runtime environments on different systems.

Advantages of the division into different enforcer types may include one or more of:

Enforcer containers require fewer rights since they are only responsible for monitoring and/or restricting specific workload container actions/events.

Specific monitoring tasks in which more events need to be processed compared with other monitoring tasks can be carried out more reliably and with less delay by means of a scaling of enforcer instances.

Orchestration functions for the enforcers are separated from the actual workload orchestration. As a result, security functionalities on an orchestrated infrastructure can be better protected vis-à-vis the workload containers and also vis-à-vis the workload administrators.

Differences in the behavior of individual enforcer types regarding the restriction of workload containers can be compared with the old version over a defined time period and can be activated only after a defined time period. This is advantageous particularly for critical applications since the risk of a manufacturer of an enforcer supplying a faulty version and the latter having effects on the application can be minimized. The same applies if, by design, a new enforcer version has a new behavior and the configuration needs to be changed as a result.

The FIGURE shows a system 6 incorporating teachings of the present disclosure, having:

a technical device 2; and a superordinate management system 1 assigned to the technical device 2.

Further technical devices can additionally be assigned to the management system 1. The technical device 2 has a container runtime environment 3. The container runtime environment 3 has container application instances C and container monitoring instances ET-C.

The container monitoring instances ET-C are designed for monitoring the container application instances C. The monitoring of the container application instances C is subdivided into monitoring tasks, wherein each monitoring task is assigned at least one privilege which exclusively enables an execution of the monitoring task to which it is assigned. The execution of the monitoring task additionally comprises an enforcement of an assigned set of rules.

The container monitoring instances ET-C are each allocated a monitoring task, wherein the container monitoring instances ET-C each have the at least one privilege assigned to their monitoring task.

The container monitoring instances ET-C were started by a scaling component 5 which is specifically designed for this, in particular a monitor orchestration instance 5 of the superordinate management system 1.

The scaling component 5 is designed to start further container monitoring instances ET-C with identical monitoring tasks as a function of a capacity utilization of the container monitoring instances ET-C.

A monitoring instance policy 8 for the scaling of the container monitoring instances ET-C is consulted by the scaling component 5.

The system 6 additionally has a monitoring agent 7 designed to produce an interface between the scaling component and the container monitoring instances ET-C and/or an interface between data sources and the container monitoring instances ET-C via which the container monitoring instances ET-C obtain data for carrying out their monitoring task.

The container application instances C, which may also be referred to as apps, were started by an application orchestration instance 4 which is not designed to start the container monitoring instances ET-C.

"ES" stands for "event sources", which are checked in respect of whether or not an event is permitted to take place on the operating system ("OS kernel"). "ET" stands for enforcer type.

Although the teachings herein have been more specifically illustrated and described in detail by means of the exemplary embodiments, the scope of the disclosure is not restricted by the examples disclosed and other variations can be derived therefrom by a person skilled in the art, without departing from the scope of protection thereof.

What is claimed is:

1. A container runtime environment comprising:
   a plurality of workload containers, which share a kernel; and
   container monitoring instances, realized as containers;
   wherein each workload container of the plurality of workload containers includes a filesystem unique to the workload container; and
   wherein:
      the container monitoring instances monitor the plurality of workload containers;
      monitoring of the plurality of workload containers is subdivided into a plurality of monitoring tasks;
      each monitoring task of the plurality of monitoring tasks:

is assigned at least one privilege exclusively enabling an execution of the monitoring task; and
      the execution of the monitoring task comprises enforcement of an assigned set of rules;
   the container monitoring instances are respectively allocated the monitoring tasks; and
   each of the container monitoring instances has the at least one privilege assigned to its respective monitoring task.

2. The container runtime environment as claimed in claim 1, wherein the monitoring task is selected from the group consisting of: monitoring started processes, setting up network connections, monitoring active network connections, monitoring write accesses, checking for weak points, limiting syscalls, allocating privileges, and/or monitoring privileges of the processes.

3. The container runtime environment as claimed in claim 1, wherein the at least one privilege allows the container monitoring instances to execute the monitoring task allocated thereto but no further monitoring tasks.

4. The container runtime environment as claimed in claim 1, wherein a first monitoring task of the monitoring tasks has a task portion which is not a task portion of a second monitoring task.

5. The container runtime environment as claimed in claim 1, wherein the monitoring tasks each have a task portion which is not a task portion of the rest of the monitoring tasks.

6. The container runtime environment as claimed in claim 1, wherein a plurality of container monitoring instances are allocated the same monitoring task.

7. The container runtime environment as claimed in claim 1, wherein the container monitoring instances are each allocated a plurality of monitoring tasks.

8. The container runtime environment as claimed in claim 1, wherein the container runtime environment runs on a device selected from the group consisting of: an industrial system, an industrial computer, an industrial device, a computer, a mobile device, a control device, a device of an Internet of Things environment, an edge device, a server, and/or a cloud server.

9. The container runtime environment as claimed in claim 1, wherein the container runtime environment is a Docker runtime environment.

10. The container runtime environment as claimed in claim 1, wherein each of the workload containers includes stacked filesystem layers.

11. The container runtime environment as claimed in claim 10, wherein each of the stacked filesystem layers of each of the workload containers is identified by a hash.

12. A system comprising:
   a technical device with a container runtime environment; and
   a superordinate management system assigned to the technical device;
   wherein the container runtime environment comprises:
      a plurality of workload containers, which share a kernel; and
      container monitoring instances, realized as containers;
   wherein each workload container of the plurality of workload containers includes a filesystem unique to the workload container; and
   wherein:
      the container monitoring instances monitor the workload containers;
      monitoring of the workload containers includes monitoring tasks;
      each monitoring task of the monitoring tasks:

is assigned at least one privilege exclusively enabling an execution of the monitoring task; and the execution of the monitoring task comprises enforcement of an assigned set of rules; and each container monitoring instance of the container monitoring instances;

is allocated a monitoring task of the monitoring tasks; and has the at least one privilege assigned to the monitoring task.

13. The system as claimed in claim 12, wherein:

the container monitoring instances were started by a monitor orchestration instance of the superordinate management system, or the container monitoring instances were started by a scaling component implemented within the container runtime environment.

14. The system as claimed in claim 12, wherein a scaling component starts further container monitoring instances with identical monitoring tasks as a function of a capacity utilization of the container monitoring instances.

15. The system as claimed in claim 12, wherein a scaling component consults a monitoring instance policy.

16. The system as claimed in claim 12, further comprising:

at least one of:

a monitoring agent to produce an interface between a scaling component and the container monitoring instances; and an interface between data sources and the container monitoring instances via which the container monitoring instances obtain data for carrying out their monitoring task.

17. The system as claimed in claim 12, wherein the workload containers were started by an application orchestration instance which is not designed to start the container monitoring instances.

18. The system as claimed in claim 12, wherein the container runtime environment is a Docker runtime environment.

19. The system as claimed in claim 12, wherein each of the workload containers includes stacked filesystem layers.

20. The system as claimed in claim 19, wherein each of the stacked filesystem layers of each of the workload containers is identified by a hash.

* * * * *